(12) United States Patent
Fujiwara

(10) Patent No.: US 10,072,447 B2
(45) Date of Patent: Sep. 11, 2018

(54) OUTER HANDLE DEVICE FOR VEHICLE DOOR

(71) Applicant: KABUSHIKI KAISHA HONDA LOCK, Miyazaki-shi, Miyazaki (JP)

(72) Inventor: Hiroto Fujiwara, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 15/034,327

(22) PCT Filed: Jun. 13, 2014

(86) PCT No.: PCT/JP2014/065720
§ 371 (c)(1),
(2) Date: May 4, 2016

(87) PCT Pub. No.: WO2015/068422
PCT Pub. Date: May 14, 2015

(65) Prior Publication Data
US 2016/0273247 A1 Sep. 22, 2016

(30) Foreign Application Priority Data
Nov. 6, 2013 (JP) .................................. 2013-230299

(51) Int. Cl.
*E05B 3/00* (2006.01)
*E05B 85/10* (2014.01)
(Continued)

(52) U.S. Cl.
CPC .......... *E05B 85/107* (2013.01); *B60Q 1/2669* (2013.01); *B60Q 1/323* (2013.01);
(Continued)

(58) Field of Classification Search
CPC ..... E05B 85/107; E05B 81/06; B60Q 1/2669; B60Q 1/323; G05G 9/02
(Continued)

(56) References Cited

U.S. PATENT DOCUMENTS 5,123,687 A * 6/1992 Pfeiffer ................. E05B 1/0092
292/336.3
5,278,547 A * 1/1994 Suman ................ B60R 25/2081
307/10.4

(Continued)

FOREIGN PATENT DOCUMENTS

| CN | 101105092 A | 1/2008 |
| CN | 101736960 A | 6/2010 |

(Continued)

OTHER PUBLICATIONS

Office Action dated Apr. 5, 2017 issued over the corresponding Chinese Patent Application 201480059319.X.
(Continued)

*Primary Examiner* — Kristina R Fulton
*Assistant Examiner* — Faria F Ahmad
(74) *Attorney, Agent, or Firm* — Carrier Blackman & Associates, P.C.; Joseph P. Carrier; Jingli Wang

(57) ABSTRACT

An outer handle device for a vehicle door is provided in which an actuator can drive the outer handle to a pop-up position where the operating portion of the outer handle projects outward from the outer panel, wherein in a state in which the outer handle is in a pop-up position, a drive lever of the actuator is held at an operated position by holding means, a release lever is pivoted by a handle lever pivoting with the outer handle when the outer handle pivots from the pop-up position to the full stroke position, the holding of the drive lever by the holding means is released by the pivoting of the release lever, and the drive lever is forcibly returned (Continued)

to the initial position. This enables an outer handle to be returned to a housed position even if there is a malfunction of an actuator-side electric drive source.

3 Claims, 12 Drawing Sheets

(51) Int. Cl.
| | |
|---|---|
| *E05B 81/06* | (2014.01) |
| *E05B 81/36* | (2014.01) |
| *E05B 81/90* | (2014.01) |
| *B60Q 1/26* | (2006.01) |
| *B60Q 1/32* | (2006.01) |
| *G05G 9/02* | (2006.01) |
| *E05B 77/06* | (2014.01) |

(52) U.S. Cl.
CPC ............. *E05B 81/06* (2013.01); *E05B 81/36* (2013.01); *E05B 81/90* (2013.01); *G05G 9/02* (2013.01); *E05B 77/06* (2013.01)

(58) Field of Classification Search
USPC ............... 292/336.3, DIG. 21, DIG. 31
See application file for complete search history.

(56) References Cited

U.S. PATENT DOCUMENTS

| | | | | |
|---|---|---|---|---|
| 5,381,065 A * | 1/1995 | Jones | ............... | B60R 25/20 180/287 |
| 6,923,481 B2 * | 8/2005 | Bruderick | ............... | E05B 81/76 16/361 |
| 8,146,393 B2 * | 4/2012 | Katagiri | ............... | E05B 17/18 292/336.3 |
| 8,360,486 B2 | 1/2013 | Gschweng et al. | | |
| 8,443,553 B1 * | 5/2013 | Polewarczyk | ............... | E05B 81/77 16/412 |
| 8,690,204 B2 * | 4/2014 | Lang | ............... | E05B 81/77 292/279 |
| 8,827,328 B2 | 9/2014 | Akizuki et al. | | |
| 8,919,047 B2 * | 12/2014 | Johnsrud | ............... | E05B 85/103 292/336.3 |
| 8,985,648 B2 * | 3/2015 | Muller | ............... | E05B 85/107 292/336.3 |
| 8,991,227 B2 * | 3/2015 | Muller | ............... | E05B 85/107 292/336.3 |
| 9,080,352 B2 * | 7/2015 | Aerts | ............... | E05B 85/103 |
| 9,103,143 B2 * | 8/2015 | Wheeler | ............... | B60Q 3/002 |
| 9,183,684 B2 * | 11/2015 | Eto | ............... | G07C 9/00126 |
| 9,322,191 B2 * | 4/2016 | Muller | ............... | E05B 85/107 |
| 2005/0121924 A1 * | 6/2005 | Chanya | ............... | E05B 85/107 292/336.3 |
| 2007/0069531 A1 * | 3/2007 | Herbert | ............... | E05B 85/107 292/336.3 |
| 2011/0148575 A1 * | 6/2011 | Sobecki | ............... | E05B 85/107 340/5.64 |
| 2011/0260848 A1 * | 10/2011 | Rodriguez Barros | ............... | B60Q 1/2665 340/438 |
| 2012/0049544 A1 * | 3/2012 | Kwon | ............... | E05B 85/107 292/336.3 |
| 2012/0228886 A1 | 9/2012 | Muller et al. | | |
| 2012/0325636 A1 * | 12/2012 | Nose | ............... | H01H 13/56 200/5 B |
| 2013/0076047 A1 * | 3/2013 | Wheeler | ............... | B60Q 3/002 292/336.3 |
| 2013/0076048 A1 * | 3/2013 | Aerts | ............... | E05B 85/103 292/336.3 |
| 2013/0127185 A1 * | 5/2013 | Lang | ............... | E05B 81/77 292/336.3 |
| 2014/0132012 A1 * | 5/2014 | Yoshino | ............... | E05B 85/103 292/336.3 |
| 2014/0373446 A1 * | 12/2014 | Weidenbacher | ............... | E05F 15/695 49/31 |
| 2015/0059424 A1 * | 3/2015 | Hunt | ............... | E05B 81/76 70/262 |
| 2015/0233154 A1 * | 8/2015 | Smart | ............... | E05B 85/103 70/237 |
| 2015/0315826 A1 * | 11/2015 | Lang | ............... | E05B 85/103 49/503 |
| 2016/0138307 A1 * | 5/2016 | Pohl | ............... | E05B 81/76 292/336.3 |
| 2016/0153216 A1 * | 6/2016 | Funahashi et al. | ..... | E05B 81/80 292/2 |
| 2016/0305176 A1 * | 10/2016 | Ko | ............... | G06F 3/04883 |

FOREIGN PATENT DOCUMENTS

| | | | | |
|---|---|---|---|---|
| CN | 203223076 U | | 10/2013 | |
| DE | 10 2008 019 335 A1 | | 10/2008 | |
| DE | 10 2009 045 875 A1 | | 4/2011 | |
| DE | 102011001001 | * | 6/2012 | ............ E05B 85/103 |
| DE | 102011009524 A1 | * | 7/2012 | ............ E05B 85/107 |
| DE | 102013112706 A1 | * | 5/2015 | ............ E05B 85/103 |
| EP | 1369545 A1 | * | 12/2003 | ............ E05B 85/107 |
| EP | 3106594 A1 | * | 12/2016 | ............ E05B 85/107 |
| JP | S62-280471 A | | 12/1987 | |
| JP | 2001-040913 A | | 2/2001 | |
| JP | 2004-244991 A | | 9/2004 | |
| JP | 2009-257050 A | | 11/2009 | |
| JP | 2010-133150 A | | 6/2010 | |
| WO | WO 0175252 A1 | * | 10/2001 | ............ E05B 85/107 |
| WO | WO 2006010649 A1 | * | 2/2006 | ............ E05B 85/107 |

OTHER PUBLICATIONS

Extended European search report issued in the corresponding EP Patent Application 14 86 0219.6 dated May 4, 2017.

* cited by examiner

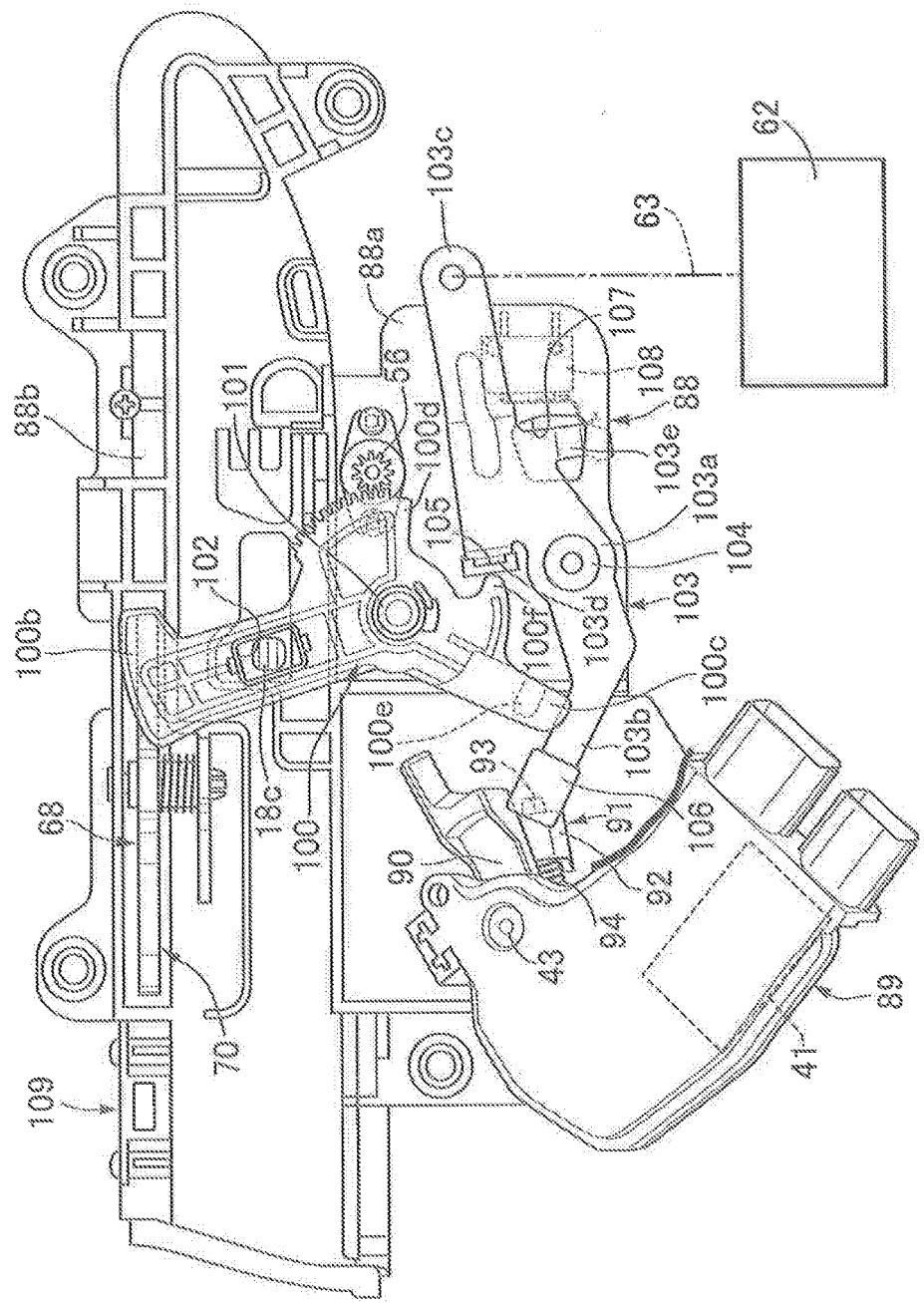

OUTER HANDLE DEVICE FOR VEHICLE DOOR

TECHNICAL FIELD

The present invention relates to an outer handle device for a vehicle door in which an outer handle having in one end part thereof a manually operable operating portion is pivotably supported on a support case mounted on an outer panel of the door, and an actuator that can drive the outer handle at a housed position where the outer handle is housed on the support case side to a pop-up position where the operating portion projects outward from the outer panel is mounted on the support case.

BACKGROUND ART

An outer handle device in which an outer handle is driven between a housed position and a pop-up position by an actuator equipped with a solenoid and a rod that is driven in the axial direction by the solenoid is known from Patent Document 1.

RELATED ART DOCUMENTS

Patent Documents

Patent Document 1: Japanese Patent Application Laid-open No. 2001-40913

SUMMARY OF THE INVENTION

Problems to be Solved by the Invention

However, in the arrangement disclosed in Patent Document 1 above, there is a possibility that, if the solenoid malfunctions in a state in which the outer handle has been driven to the pop-up position, the outer handle will not be able to return from the pop-up position to the housed position. Furthermore, in order to hold the outer handle at the pop-up position it is necessary to maintain the solenoid in an energized state, and there is a possibility that the power consumption will increase.

The present invention has been accomplished in light of such circumstances, and it is an object thereof to provide an outer handle device for a vehicle door that enables an outer handle to be returned to a housed position even if there is a malfunction of an actuator-side electric drive source and, moreover, that reduces the power consumption for holding the outer handle at a pop-up position.

Means for Solving the Problems

In order to attain the above object, according to a first aspect of the present invention, there is provided an outer handle device for a vehicle door in which an outer handle having in one end part thereof a manually operable operating portion is pivotably supported on a support case mounted on an outer panel of a door, and an actuator that can drive the outer handle at a housed position where the outer handle is housed on the support case side to a pop-up position where the operating portion projects outward from the outer panel is mounted on the support case, characterized in that the actuator comprises a drive lever that can be pivoted between an initial position and an operated position and an electric drive source that pivots the drive lever from the initial position to the operated position at a time of energization and that allows the drive lever to return from the operated position to the initial position in a non-energized state when the drive lever is at the operated position, the outer handle pivotingly urged toward the housed position side is supported on the support case so as to be able to pivot to a full stroke position accompanying a manual operation from the pop-up position, holding means that mechanically holds the drive lever at the operated position is provided on the support case, a handle lever operatively linked to the outer handle so as to be pushed and pivoted by the drive lever in response to pivoting of the drive lever from the initial position to the operated position and, as a result of the pivoting, pivot the outer handle from the housed position to the pop-up position is supported on the support case so as to pivot together with the outer handle while leaving the drive lever at the operated position when the outer handle pivots from the pop-up position to the full stroke position, and a release lever that pivots in response to pivoting of the handle lever accompanying a manual operation of the outer handle from the pop-up position to the full stroke position so as to release the holding by the holding means and forcibly return the drive lever to the initial position is supported on the support case.

Further, according to a second aspect of the present invention, in addition to the first aspect, a switch that outputs a signal for opening a window of the door so that outside air flows into a vehicle compartment is mounted on the support case such that the signal is outputted by changing of the switching mode in response to pivoting of the release lever accompanying manual operation of the outer handle from the pop-up position to the full stroke position.

Furthermore, according to a third aspect of the present invention, in addition to the first or second aspect, a light that illuminates the operating portion of the outer handle in a state in which it is at the pop-up position is mounted on the support case or the outer handle.

Effects of the Invention

In accordance with the first aspect of the present invention, in a state in which the handle lever has been pivoted by the drive lever of the actuator and the outer handle has been pivoted from the housed position to the pop-up position, the drive lever is held at the operated position by the holding means, and in this state the pop-up position of the outer handle is held even if the electric drive source of the actuator is in a non-energized state. Furthermore, the electric drive source of the actuator allows the drive lever at the operated position to return to the initial position by the action of an external force when holding by the holding means is released. When a vehicle user pivots the outer handle from the pop-up position to the full stroke position in order to open the door, the release lever is pivoted by the handle lever pivoting together with the outer handle. Since this release lever releases the holding of the drive lever by the holding means and forcibly returns the drive lever to the initial position, even if the electric drive source of the actuator malfunctions, it is possible for the outer handle, which is urged to the housed position side, to return to the housed position by detaching the hand from the outer handle. Therefore, if the electric drive source on the actuator side malfunctions, the outer handle can be returned to the housed position, and power consumption for holding the outer handle at the pop-up position can be reduced.

Furthermore, in accordance with the second aspect of the present invention, since outside air flows into the vehicle compartment by opening the window of the door in response to pivoting of the release lever accompanying manual operation of the outer handle from the pop-up position to the full stroke position, it is possible to reduce the difference in air pressure between the inside and the outside of the door, thus making an opening operation of the door smooth.

Moreover, in accordance with the third aspect of the present invention, since the operating portion of the outer handle at the pop-up position is illuminated with light, the operating portion of the outer handle can easily be seen even in a dark state such as at night.

BRIEF DESCRIPTION OF DRAWINGS

FIG. 12 is a view, corresponding to FIG. 9, in a state in which the outer handle has pivoted to a full stroke position. (second embodiment)

EXPLANATION OF REFERENCE NUMERALS AND SYMBOLS

Figure 1:
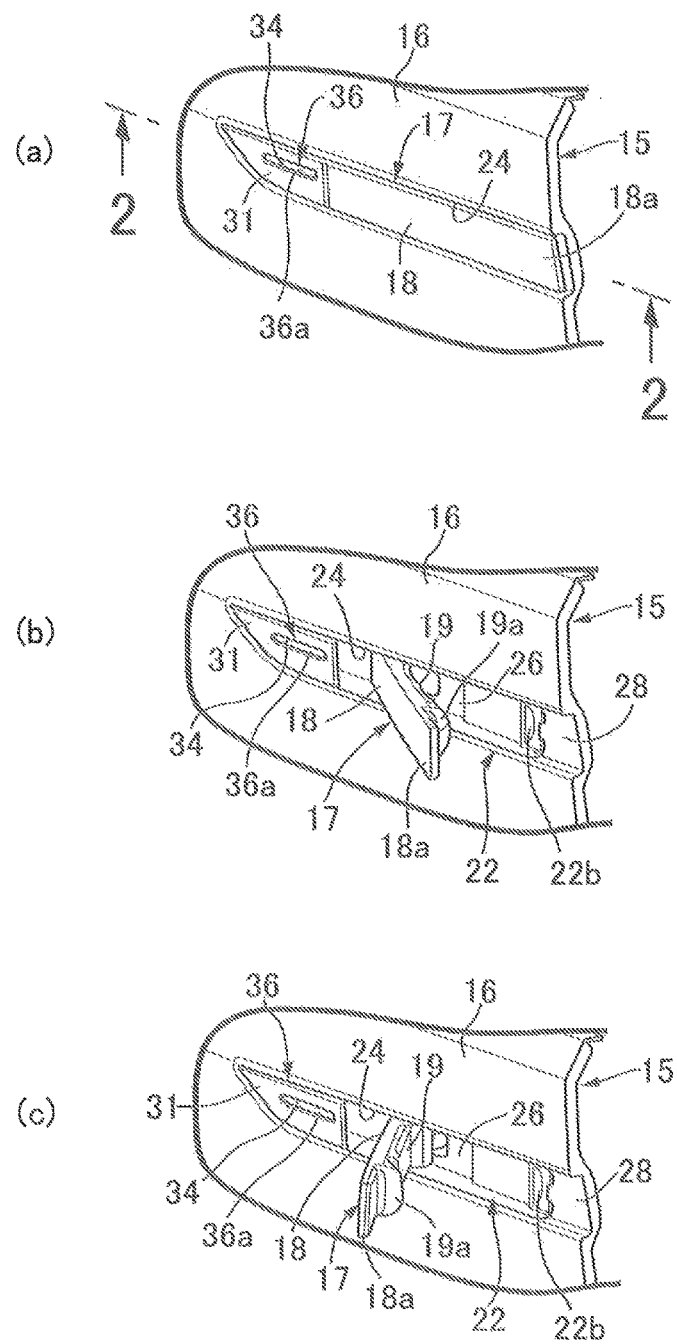
FIG. 1 shows a first embodiment and is a side view of an essential part of a door in a state in which an outer handle is at a housed position (a), a pop-up position (b), and a full stroke position (c). (first embodiment)

15 Side door, which is a door
16 Outer panel
17 Outer handle
18a Operating portion
22, 88 Support case
39, 89 Actuator
40, 90 Drive lever
41 Electric motor, which is an electric drive source
44 Torsion spring, which is holding means
50, 100 Handle lever
58, 103 Release lever
75, 109 Light
91 Holding means
108 Switch

MODES FOR CARRYING OUT THE INVENTION

Embodiments of the present invention are explained below by reference to the attached drawings.

First Embodiment

A first embodiment of the present invention is explained by reference to FIG. 1 to FIG. 8. First, in FIG. 1, an outer handle 17 formed lengthwise in the vehicle fore-and-aft direction is disposed on an outer panel 16 on a side door 15 of a passenger vehicle; this outer handle 17 can change its pivoting position between a housed position in which as shown in FIG. 1 (a) an outer face of the outer panel 16 and an outer face of the outer handle 17 are flush with each other, a pop-up position in which as shown in FIG. 1 (b) an operating portion 18a of one end part of the outer handle 17 projects sideways from the outer face of the outer panel 16, and a full stroke position in which as shown in FIG. 1 (c) the operating portion 18a is gripped and operated so as to pivot it further outward from the pop-up position.

Figure 2:
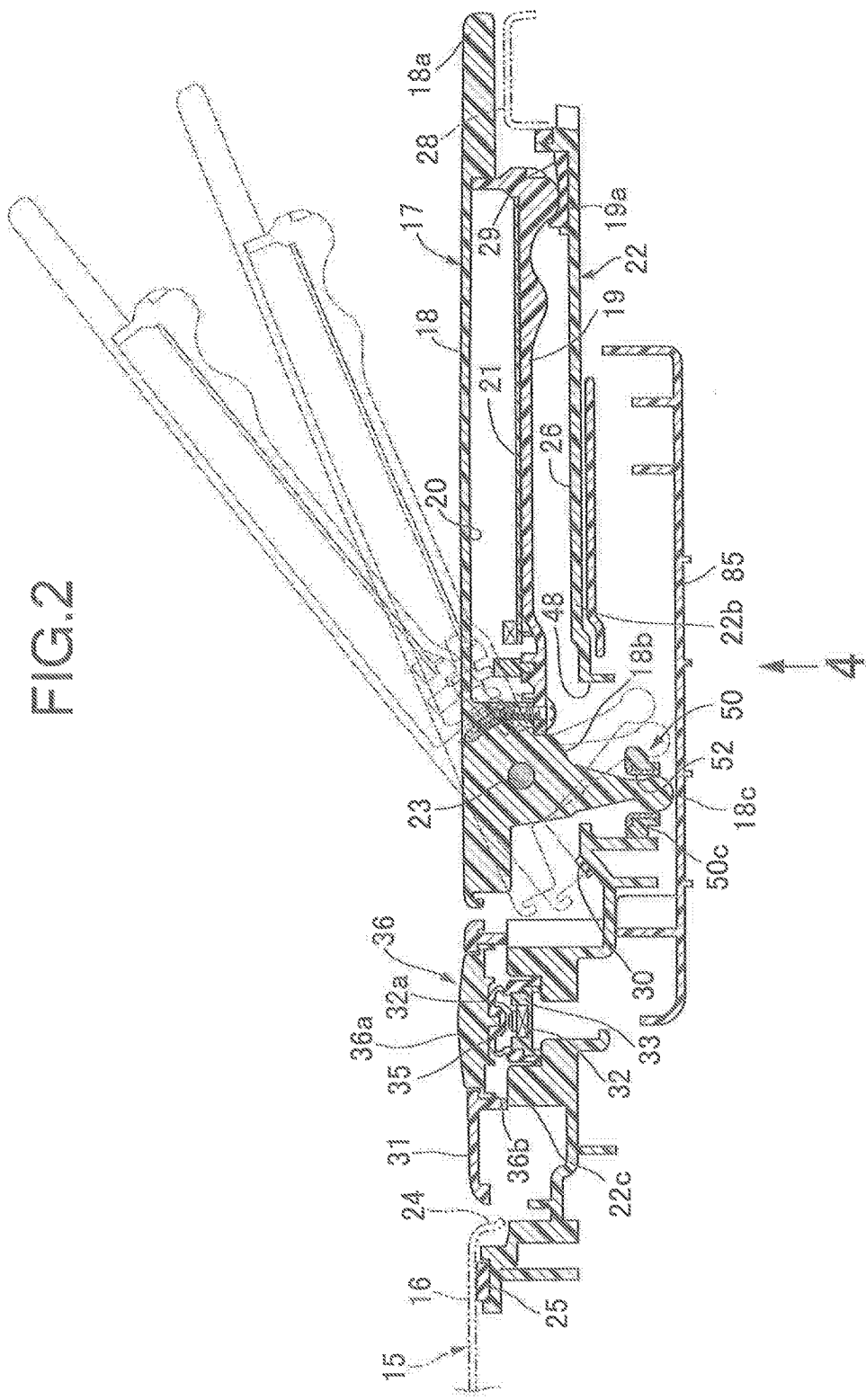
FIG. 2 is a sectional view along line 2-2 in FIG. 1. (first embodiment)
Figure 3:
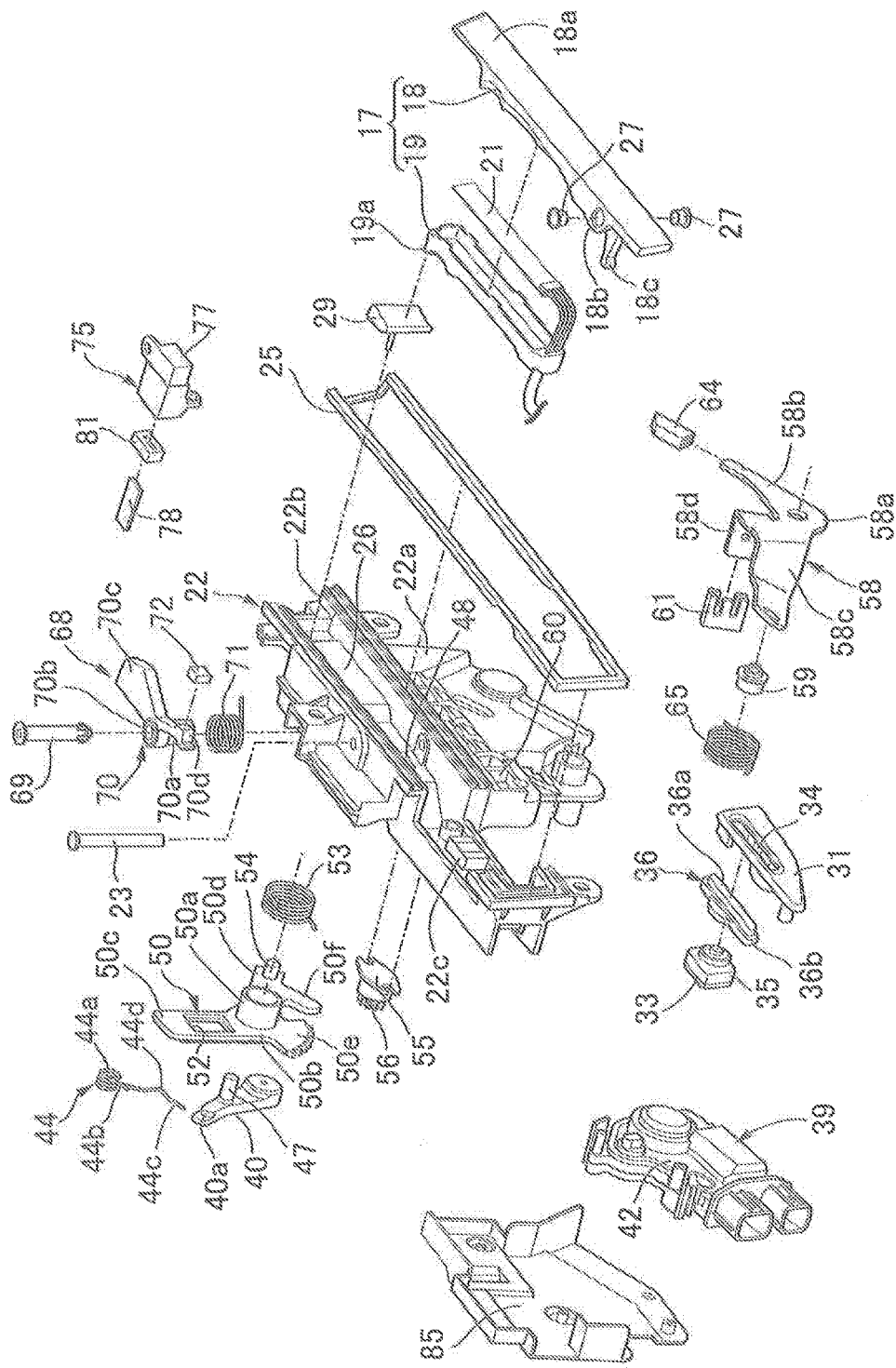
FIG. 3 is an exploded perspective view of a portion shown in FIG. 2. (first embodiment)

Referring in addition to FIG. 2 and FIG. 3, the outer handle 17 is formed from a handle main body 18 that extends lengthwise in the vehicle fore-and-aft direction while having a recess part 20 facing the outer panel 16 side and that has the operating portion 18a in one end part, and a cover member 19 that is secured to the handle main body 18 from the outer panel 16 side so as to close the recess part 20, and a board 21 is mounted on an inner face of the cover member 19, an electronic component such as a touch sensor or an antenna being mounted on the board 21.

The outer handle 17 is pivotably supported via a support shaft 23 on a support case 22 fixed to the outer panel 16. Provided in the outer panel 16 is an opening 24 extending lengthwise in the vehicle fore-and-aft direction, the support case 22 being secured to an inner face side of the outer panel 16 while having a support plate portion 22a opposing the inner face of the outer panel 16 and a handle support portion 22b provided integrally with an upper part of the support plate portion 22a so as to close the opening 24 from the inner side of the outer panel 16 and extending in the vehicle fore-and-aft direction, and a seal member 25 for sealing the peripheral edge of the opening 24 being disposed between the support case 22 and the outer panel 16.

Formed in the handle support portion 22b of the support case 22 so as to be recessed inward of the outer panel 16 is a housing recess part 26 extending lengthwise in the vehicle fore-and-aft direction so as to correspond to the opening 24. A majority of the outer handle 17 excluding the operating portion 18a is housed in the housing recess part 26 at the housed position in which the outer handle 17 is flush with the outer face of the outer panel 16. Furthermore, the support shaft 23 is mounted on the handle support portion 22b of the support case 22 so as to traverse the housing recess part 26 in the vertical direction, and the support shaft 23 is inserted, via a pair of short cylindrical collars 27 and 27, through a support portion 18b provided integrally with the handle main body 18 in an area close to the other end of the outer handle 17 and disposed within the housing recess part 26. Furthermore, provided in the outer panel 16 so as to be connected to the opening 24 is a recess part 28 housing the operating portion 18a of the outer handle 17 in a state in which the outer handle 17 is at the housed position.

Mounted on the handle support portion 22b of the support case 22 so as to be positioned within the housing recess part 26 is a first elastic member 29 against which abuts an abutting projecting portion 19a provided integrally with the cover member 19 so as to be close to the operating portion 18a in a state in which the outer handle 17 is at the housed position, and adhered to the handle support portion 22b so as to be positioned within the housing recess part 26 is a second elastic member 30 against which abuts the other end part of the handle main body 18 of the outer handle 17 at the full stroke position (see FIG. 2).

The remaining portion of the housing recess part 26 apart from a portion housing the majority of the outer handle 17 at the housed position is closed by a base cover 31 mounted on the support case 22 so as to be adjacent to the other end part of the outer handle 17 at the housed position, and a switch support portion 22c projecting into the housing recess part 26 is provided integrally with the handle support portion 22b of the support case 22 at a position corresponding to the base cover 31.

Focusing on FIG. 2, supported on the switch support portion 22c is a switch holder 33 for holding a tact switch 32 that turns ON/OFF in response to an operation by a vehicle user in order to show an intention to lock the side door 15. On the other hand, a rectangular window 34 extending lengthwise in the vehicle fore-and-aft direction is provided in the base cover 31 in a portion corresponding to the switch support portion 22c. Furthermore, an intermediate cap 35 made of an elastic material is fitted onto the switch holder 33 so as to cover the tact switch 32, the intermediate cap 35 being capable of applying a pressing force to a to-be-pressed portion 32a of the tact switch 32. A switch button 36 is provided so as to be connected to the intermediate cap 35, the switch button 36 being made of a hard synthetic resin and having a rectangular pushing operating portion 36a disposed in the window 34, and a collar portion 36b abutting against an inner face of the base cover 31 on an area around the window 34 is formed integrally with the switch button 36. Moreover, the switch button 36 is urged toward the non-operated position side in which the collar portion 36b abuts against the inner face of the base cover 31 by virtue of the resilient force exhibited by the intermediate cap 35.

Figure 4:
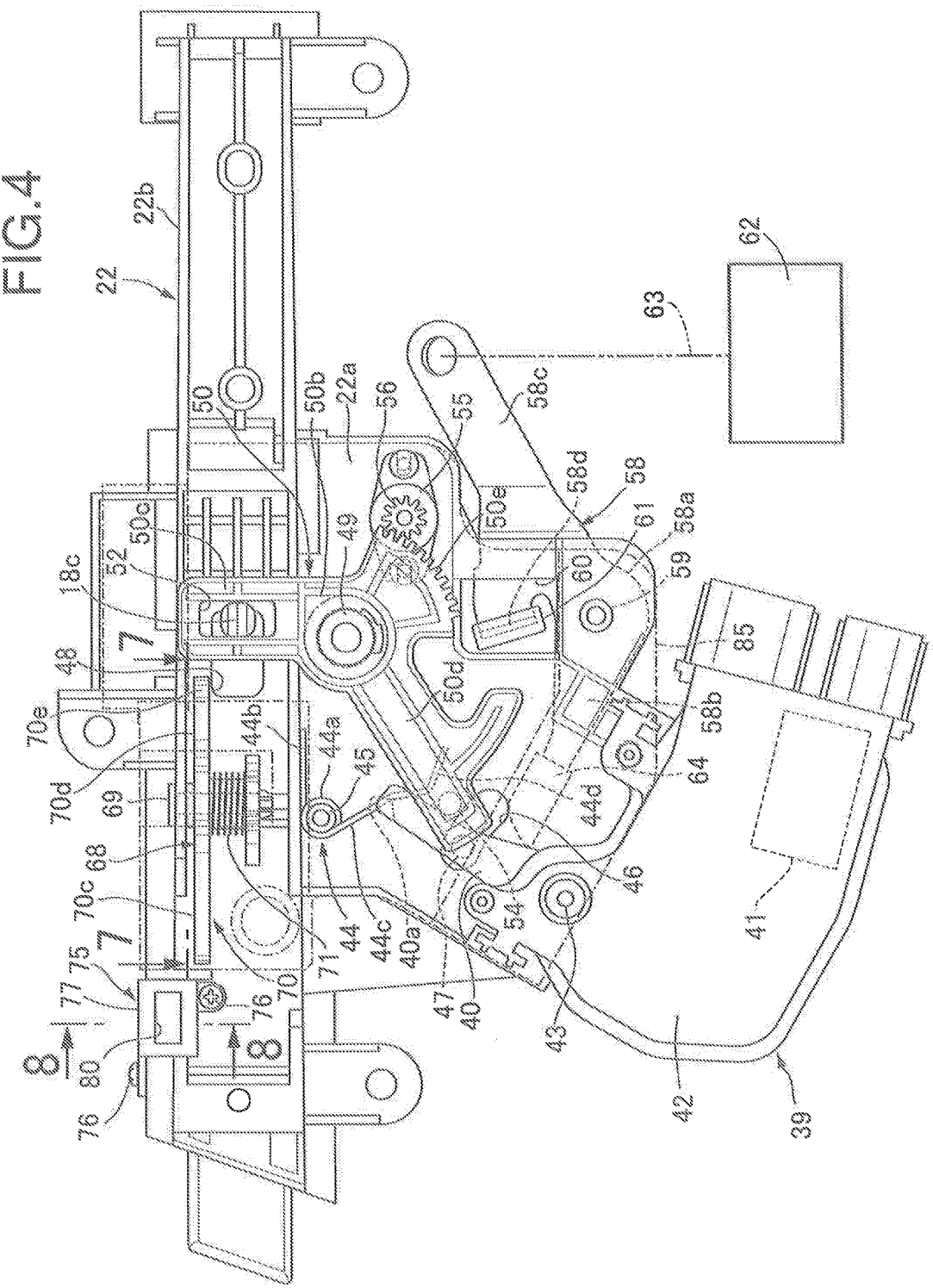
FIG. 4 is a view in the direction of arrow 4 in FIG. 2 showing a state in which a cover member is omitted and a drive lever is at an initial position. (first embodiment)
Figure 5:
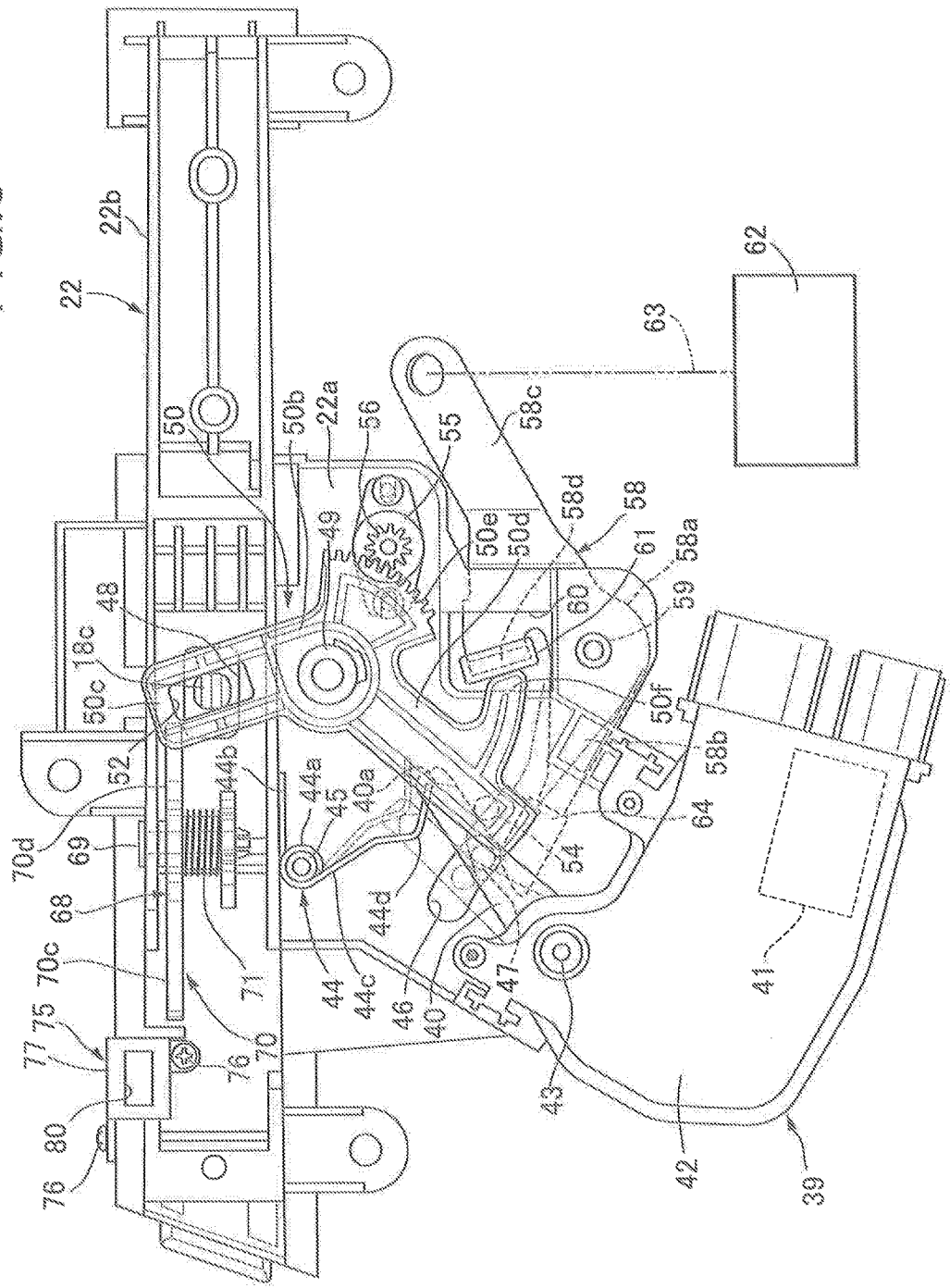
FIG. 5 is a view, corresponding to FIG. 4, in a state in which the drive lever has pivoted to an operated position. (first embodiment)

Referring in addition to FIG. 4 and FIG. 5, an actuator 39 is mounted on the support plate portion 22a of the support case 22, the actuator 39 enabling the outer handle 17 at the housed position in which it is housed on the support case 22 side to be driven to the pop-up position in which the operating portion 18a projects to the outside from the outer panel 16. This actuator 39 is formed from a drive lever 40 that can be pivoted between an initial position shown in FIG. 4 and an operated position shown in FIG. 5, and an electric motor 41 as an electric drive source that, when energized, pivots the drive lever 40 from the initial position to the operated position and that, in a non-energized state when the drive lever 40 is at the operated position, allows the drive lever 40 to return from the operated position to the initial position.

An actuator case 42 housing the electric motor 41 is mounted on a lower part of the support plate portion 22a of the support case 22 so as to protrude downward from the support plate portion 22a. Furthermore, one end part of the drive lever 40 is fixed to a pivot shaft 43 pivotably supported on an upper part of the actuator case 42, and a transmission mechanism (not illustrated) provided between the electric motor 41 and the pivot shaft 43 is housed in the actuator case 42.

Moreover, holding means that mechanically holds the drive lever 40 at the operated position is provided on the support plate portion 22a of the support case 22, and in this embodiment the holding means (a biasing device) is a torsion spring 44. A cylindrical spring support part 45 is projectingly provided on the support plate portion 22a of the support case 22 above the drive lever 40 and beneath the handle support portion 22b, and the torsion spring 44 has a coil portion 44a surrounding the spring support part 45 and first and second arm portions 44b and 44c extending from opposite ends of the coil portion 44a.

The first arm portion 44b of the torsion spring 44 abuts from below against the handle support portion 22b, which is present above the spring support part 45. Furthermore, the second arm portion 44c is disposed so as to extend from the spring support part 45 to the drive lever 40 side, and a bent peak portion 44d is formed on an intermediate part of the second arm portion 44c so as to project toward the drive lever 40 side.

On the other hand, a face of the drive lever 40 that opposes the support plate portion 22a side is provided integrally with an abutment step portion 40a formed into a peak shape so as to abut against the second arm portion 44c from below, and in a state in which the drive lever 40 is at the initial position a portion of the second arm portion 44c that is on the spring support part 45 side with respect to the peak portion 44d abuts resiliently against the abutment step portion 40a from above. When the drive lever 40 pivots from the initial position to the operated position shown by the solid line in FIG. 5 via an intermediate position shown by the chain line in FIG. 5, the abutment step portion 40a rides over the peak portion 44d while pushing the second arm portion 44c upward. In a state in which the drive lever 40 has pivoted to the operated position, as long as no external force acts on the drive lever 40, the drive lever 40 is mechanically held at the operated position by the peak portion 44d of the torsion spring 44.

Furthermore, an arc-shaped guide hole 46 with the pivot shaft 43 as an axis is formed in the support plate portion 22a of the support case 22, and a pin 47 extending through the guide hole 46 is implanted in the drive lever 40, the guide hole 46 being formed so as to allow the pin 47 to move accompanying pivoting of the drive lever 40 between the initial position and the operated position.

A linking projecting portion 18c connected to the support portion 18b is provided integrally with the handle main body 18 of the outer handle 17, this linking projecting portion 18c extending through an elongated hole 48 that is provided in the handle support portion 22b of the support case 22 so as to extend lengthwise in the fore-and-aft direction, and the extremity of the linking projecting portion 18c projects inward from the handle support portion 22b of the support case 22.

Furthermore, provided integrally with the support plate portion 22a of the support case 22 is a cylindrical lever support part 49 disposed beneath the handle support portion 22b in a portion corresponding to the elongated hole 48, and a handle lever 50 is pivotably supported on the lever support part 49.

The handle lever 50 integrally has a first lever base portion 50b on which a cylindrical first support tube portion 50a (see FIG. 3) pivotably supported on the lever support part 49 is provided, an outer handle side link arm portion 50c extending upward from the first lever base portion 50b, a drive lever side link arm portion 50d extending from the first lever base portion 50b obliquely downward toward the drive lever 40 side, and a sector gear portion 50e projecting from the first lever base portion 50b in the opposite direction to the torsion spring 44.

A link hole 52 extending lengthwise in the longitudinal direction is formed in the outer handle side link arm portion 50c, and the extremity of the linking projecting portion 18c of the outer handle 17 is inserted through and linked to the link hole 52. That is, the handle lever 50 is operatively linked to the outer handle 17, and the handle lever 50 is urged in a direction that returns the outer handle 17 to the housed position side by the spring force of a first return spring 53, which is a torsion spring provided between the handle lever 50 and the support plate portion 22a so as to surround the first support tube portion 50a (see FIG. 3).

Implanted into the extremity of the drive lever side link arm portion 50d so as to project toward the support plate portion 22a side is an abutment pin 54 that abuts against the drive lever 40 at the initial position from the operated position side. The abutment pin 54 is pushed by the drive lever 40 in response to pivoting of the drive lever 40 from the initial position to the operated position, and the handle lever 50 pivots so as to drive the outer handle 17 from the housed position to the pop-up position.

Moreover, when the outer handle 17 pivots from the pop-up position to the full stroke position, the handle lever 50 pivots together with the outer handle 17 while leaving the drive lever 40 at the operated position due to the drive lever 40 being held by the torsion spring 44.

Furthermore, the sector gear portion 50e meshes with a gear 56 of a rotary damper 55 secured to the support plate portion 22a. This rotary damper 55 functions so as to slowly pivot to the housed position even when the hand is detached from the outer handle 17 after pivoting the outer handle 17, which is urged to the side on which it returns to the housed position side, to the full stroke position.

Moreover, pivotably supported on the support plate portion 22a of the support case 22 is a release lever 58 that pivots in response to pivoting of the handle lever 50 accompanying manual operation of the outer handle 17 from the pop-up position to the full stroke position to thus release the holding by the torsion spring 44 and forcibly return the drive lever 40 to the initial position.

This release lever 58 is disposed between the support plate portion 22a and the outer panel 16, and integrally has a second lever base portion 58a that is pivotably supported on the support plate portion 22a via a first shaft 59 mounted on the support plate portion 22a so as to be disposed beneath the handle lever 50, a drive lever side arm portion 58b that extends from the second lever base portion 58a to the drive lever 40 side, and a latch mechanism side arm portion 58c that is provided connectedly with the second lever base portion 58a so as to have, together with the drive lever side arm portion 58b, a substantially V shaped form and project from the support plate portion 22a toward the side opposite to the mounting part of the actuator 39.

A rectangular through hole 60 disposed between the first lever base portion 50b of the handle lever 50 and the second lever base portion 58a of the release lever 58 is formed in the support plate portion 22a, a pressure-receiving portion 58d inserted through the through hole 60 is provided integrally with and connected to an intermediate part of the latch mechanism side arm portion 58c at right angles, and a handle side cap 61 made of an elastic material is fitted onto the pressure-receiving portion 58d. On the other hand, a pushing arm portion 50f is connectedly provided on the drive lever side link arm portion 50d of the handle lever 50, the extremity of the pushing arm portion 50f abutting against the handle side cap 61 due to the handle lever 50 pivoting together with the outer handle 17 when the outer handle 17 has pivoted from the housed position to the pop-up position. When the outer handle 17 pivots from the pop-up position to the full stroke position, the handle lever 50 pivots together with the outer handle 17 to thus push the handle side cap 61, that is, the pressure-receiving portion 58d, via the pushing arm portion 50f, and the release lever 58 pivots to the position shown in FIG. 6.

Disposed on the side door 15 is a latch mechanism 62 that is capable of switching between a latched state in which a closed state of the side door 15 is held by engaging with the vehicle body side and an unlatched state in which the side door 15 can be opened, pivoting of the release lever 58 being transmitted to the latch mechanism 62 via a transmission rod 63 having one end part linked to the extremity of the latch mechanism side arm portion 58c.

The latch mechanism 62 includes an electric motor (not illustrated) that can switch between an unlocked state in which release of the latched state is enabled and a locked state in which release of the latched state is disabled, and the latch mechanism 62 attains an unlocked state in response to a touch sensor within the outer handle 17 detecting that the outer handle 17 in the locked state is being gripped by a legitimate vehicle user.

When the latch mechanism 62 attains an unlocked state, it attains an unlatched state by virtue of a force transmitted via the transmission rod 63 from the release lever 58 in response to pivoting of the outer handle 17 from the pop-up position to the full stroke position, and in this state the side door 15 can be opened.

On the other hand, the electric motor 41 of the actuator 39 pivots the drive lever 40 from the initial position to the operated position in a state in which it has been confirmed that a vehicle user within a predetermined range from the vehicle is a legitimate vehicle user by communication between a portable device carried by the user and the vehicle, and the side door 15 can be opened by the vehicle user gripping the outer handle 17, which has attained the pop-up position in response to pivoting of the drive lever 40, and pivoting it to the full stroke position side. In addition, operation of the electric motor 41 of the actuator 39 may be started by an operation on the portable device side without preauthorization by communication with the portable device. Furthermore, the electric motor 41 of the actuator 39 can be rotated forward and in reverse; when a state in which the outer handle 17 is at the pop-up position has continued for at least a predetermined time, in order to return the outer handle 17 to the housed position, the electric motor 41 may be operated in the reverse direction so as to return the drive lever 40 from the operated position to the initial position.

Figure 6:
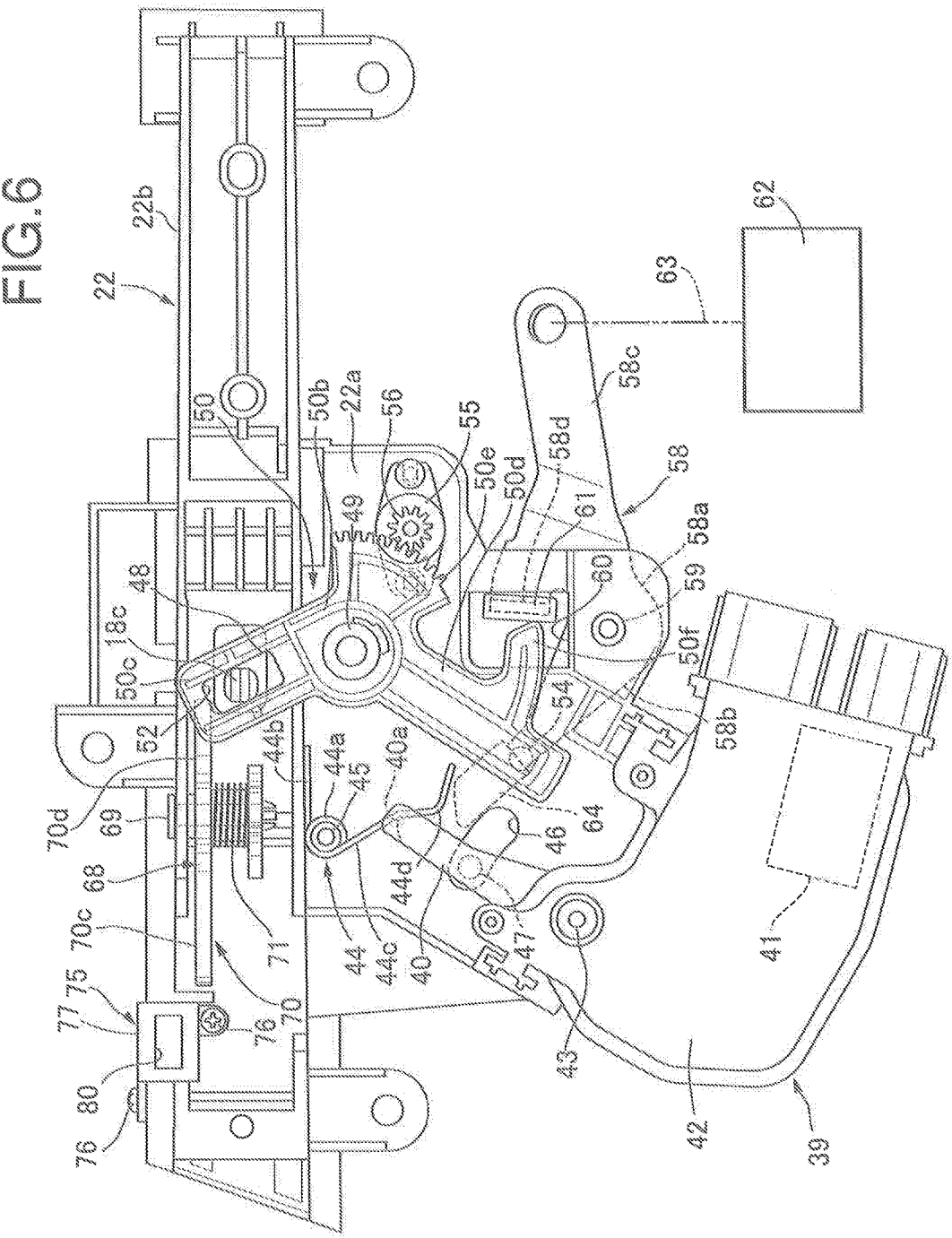
FIG. 6 is a view, corresponding to FIG. 4, in a state in which the outer handle has pivoted to the full stroke position. (first embodiment)

A drive lever side cap 64 made of an elastic material is fitted onto the extremity of the drive lever side arm portion 58b of the release lever 58, the drive lever side cap 64 abutting against the pin 47 of the drive lever 40, which is inserted through the guide hole 46, in a state in which the drive lever 40 has pivoted from the initial position to the operated position. By pivoting of the release lever 58 in response to pivoting of the outer handle 17 from the pop-up position to the full stroke position, the pin 47, that is, the drive lever 40, is pushed by the drive lever side arm portion 58b of the release lever 58, and as shown in FIG. 6 the drive lever 40 is forcibly pivoted so that the abutment step portion 40a rides over the peak portion 44d of the second arm portion 44c while pushing upward the second arm portion 44c of the torsion spring 44, and in a state in which it has ridden over the peak portion 44d the drive lever 40 is returned to the initial position by virtue of a resilient force applied from the peak portion 44d of the second arm portion 44c.

A second return spring 65, which is a torsion spring surrounding the first shaft 59 (see FIG. 3), is provided between the release lever 58 and the support plate portion 22a, and by virtue of the spring force of the second return spring 65, the release lever 58 is pivotingly urged to the side on which the handle side cap 61 abuts against the pushing arm portion 50f of the handle lever 50.

Figure 7:
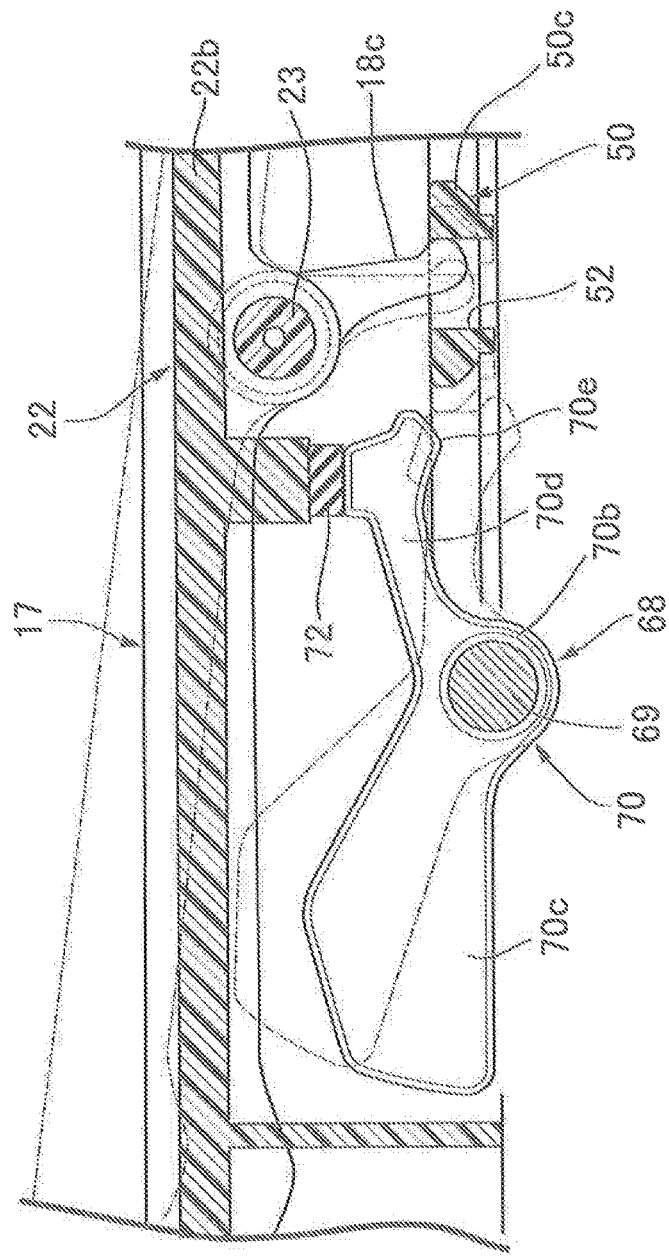
FIG. 7 is a sectional view along line 7-7 in FIG. 4. (first embodiment)
Figure 8:
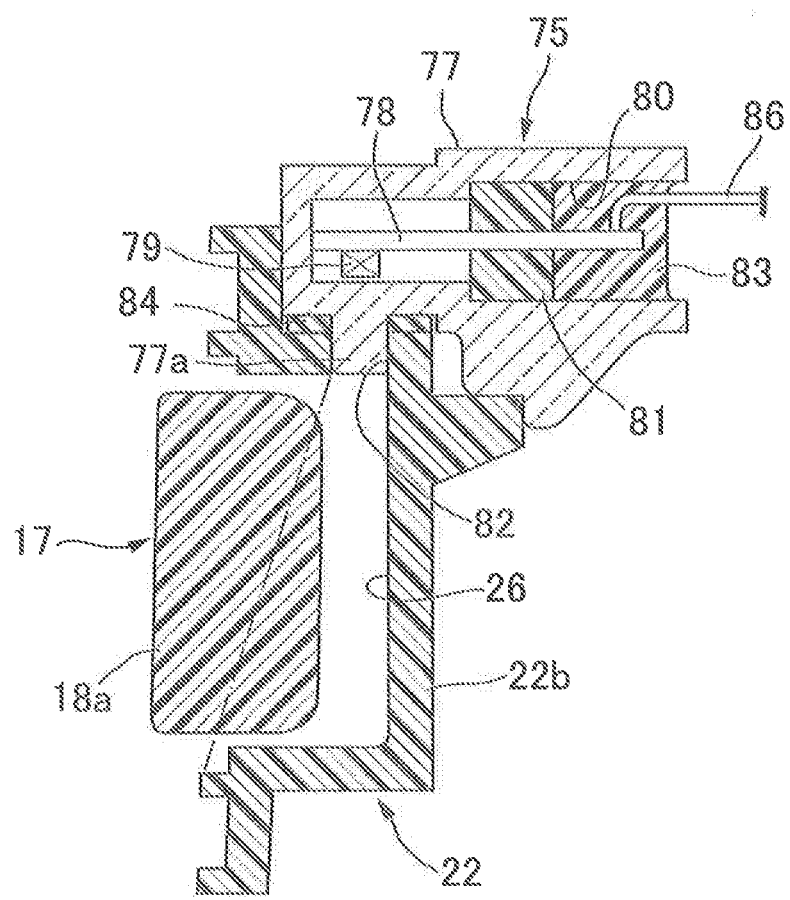
FIG. 8 is a sectional view along line 8-8 in FIG. 4. (first embodiment)

Referring in addition to FIG. 7, disposed on the handle support portion 22b of the support case 22 is an inertia mechanism 68 for preventing the side door 15 from being undesirably opened due to the outer handle 17 pivoting to the full stroke position by virtue of the impact of a side collision with the side door 15 in a state in which the outer handle 17 is at the housed position.

This inertia mechanism 68 includes an inertia lever 70 pivotably supported on the handle support portion 22b via a second shaft 69 provided on the handle support portion 22b and having an axis parallel to the support shaft 23, which pivotably supports the outer handle 17 on the handle support portion 22b, and a third return spring 71 provided between the handle support portion 22b and the inertia lever 70.

The inertia lever 70 integrally has a third lever base portion 70b on which a cylindrical second support tube portion 70a pivotably supported by the second shaft 69 is provided, a weight arm portion 70c extending from the third lever base portion 70b to the side opposite to the outer handle side link arm portion 50c of the handle lever 50, and a restriction arm portion 70d extending from the third lever base portion 70b to the outer handle side link arm portion 50c side of the handle lever 50. A sponge 72 is adhered to the handle support portion 22b, and the extremity of the restriction arm portion 70d abuts against the sponge 72 when the inertia lever 70 is in a state in which it has pivoted to a position in which pivoting of the outer handle 17 to the full stroke position is allowed (state shown by the solid line in FIG. 7).

The third return spring 71 is a torsion spring provided between the handle support portion 22b and the inertia lever 70 so as to surround the second support tube portion 70a, and the inertia lever 70 is pivotingly urged by virtue of the spring force of the third return spring 71 to the side on which the extremity of the restriction arm portion 70d abuts against the sponge 72.

When an impact due to the above side collision acts on the side door 15, the inertia lever 70 pivots, more quickly than pivoting of the handle lever 50, to the position shown by the chain line in FIG. 7 so as to separate the restriction arm portion 70d from the sponge 72, and when the handle lever 50 pivots together with the outer handle 17, the outer handle side link arm portion 50c of the handle lever 50 abuts against the extremity of the restriction arm portion 70d as shown by the chain line in FIG. 7, thus restricting pivoting of the handle lever 50 and thereby preventing the outer handle 17, which pivots together with the handle lever 50, from pivoting to the full stroke position side.

An abutment face 70e is formed on the restriction arm portion 70d of the inertia lever 70, the abutment face 70e abuts against the outer handle side linking portion 50c of the handle lever 50 in response to pivoting of the outer handle 17 from the pop-up position to the full stroke position in a state in which the restriction arm portion 70d is abutting against the sponge 72, and the abutment face 70e is formed in an inclined manner so as to obliquely intersect the direction of movement of the outer handle side linking portion 50c so that the inertia lever 70 can pivot to the side on which the sponge 72 is compressed by the restriction arm portion 70d by virtue of a pressing force applied from the outer handle side linking portion 50c. This makes the inertia lever 70 pivot slightly each time the outer handle 17 pivots, thereby preventing the occurrence of a state in which the inertia lever 70 is stationary for a long period of time and thus becomes seized.

In addition, in case the inertia mechanism 68 malfunctions, it is possible to adsorb the impact at the time of a side collision by the rotary damper 55, thus preventing the outer handle 17 from pivoting to the full stroke position side.

Mounted on the support case 22 or the outer handle 17 is a light 75 illuminating the operating portion 18a of the outer handle 17 at the pop-up position. In this embodiment, the light 75 illuminating the operating portion 18a of the outer handle 17 at the pop-up position is mounted on the handle support portion 22b of the support case 22.

This light 75 includes a light case 77 formed from a translucent synthetic resin and secured to the handle support portion 22b by, for example, a pair of screw members 76 and 76, and a light-emitting diode 79 provided on a board 78 inserted into and supported within the light case 77.

The light case 77 is formed into a box shape having an insertion hole 80 opening on the side opposite to the outer panel 16, and the board 78 inserted into the insertion hole 80 is held by a grommet 81 fitted into the insertion hole 80. The light-emitting diode 79 is provided on an end part lower face, on the outer panel 16 side, of the board 78, and the open end of the insertion hole 80 is filled with a potting material 83 for sealing part of a lead 86 connected to the board 78.

A through hole 82 opening in the housing recess part 26 at a position corresponding to the operating portion 18a of the outer handle 17 is provided in an upper part of the handle support portion 22b so as to be positioned beneath the light-emitting diode 79, a light guide portion 77a that guides light from the light-emitting diode 79 is formed integrally with the light case 77 and is fitted in the through hole 82, and a seal member 84 endlessly surrounding the through hole 82 is disposed between the light case 77 and the handle support portion 22b.

Mounted on the support case 22 is a case cover 85 covering part of the actuator 39 disposed on the support case 22, the torsion spring 44, the handle lever 50, the rotary damper 55, the inertia mechanism 68, etc., and this case cover 85 can prevent an adverse effect due to water or dust entering the interior of the side door 15 through a gap between the outer panel 16 and a window glass from acting on the actuator 39, the torsion spring 44, the handle lever 50, the rotary damper 55, the inertia mechanism 68, etc.

The operation of this first embodiment is now explained. The actuator 39 that enables the outer handle 17, which has the manually operable operating portion 18a in one end part, to be driven to the pop-up position in which the operating portion 18a projects outward from the outer panel 16 of the side door 15 is mounted on the support case 22 mounted on the outer panel 16. The actuator 39 is formed so as to include the drive lever 40, which can pivot between the initial position and the operated position, and the electric motor 41, which pivots the drive lever 40 from the initial position to the operated position at the time of energization and which allows the drive lever 40 to return from the operated position to the initial position in a non-energized state when the drive lever 40 is at the operated position. The outer handle 17, which is pivotingly urged to the housed position side in which it is housed in the support case 22, is supported on the support case 22 so that it can pivot to the full stroke position accompanying manual operation from the pop-up position. The torsion spring 44, which mechanically holds the drive lever 40 at the operated position, is mounted on the support case 22. The handle lever 50, which is operatively linked to the outer handle 17 so as to pivot the outer handle 17 from the housed position to the pop-up position by being pushed and pivoted by the drive lever 40 in response to pivoting of the drive lever 40 from the initial position to the operated position, is supported on the support case 22 so as to pivot together with the outer handle 17 while leaving the drive lever 40 at the operated position when the outer handle 17 pivots from the pop-up position to the full stroke position. The release lever 58, which pivots in response to pivoting of the handle lever 50 accompanying manual operation of the outer handle 17 from the pop-up position to the full stroke position to thus release the holding by the holding means and which forcibly returns the drive lever 40 to the initial position, is supported on the support case 22.

Therefore, in a state in which the handle lever 50 has been pivoted by the drive lever 40 of the actuator 39 and the outer handle 17 has been pivoted from the housed position to the pop-up position, the drive lever 40 is held at the operated position by the torsion spring 44, and in this state the pop-up position of the outer handle 17 is held even if the electric motor 41 of the actuator 39 is in a non-energized state. Furthermore, the electric motor 41 of the actuator 39 allows the drive lever 40 at the operated position to return to the initial position by the action of an external force when holding by the torsion spring 44 is released. When a vehicle user pivots the outer handle 17 from the pop-up position to the full stroke position in order to open the side door 15, the release lever 58 is pivoted by the handle lever 50 pivoting together with the outer handle 17. Since this release lever 58 releases the holding of the drive lever 40 by the torsion spring 44 and forcibly returns the drive lever 40 to the initial position, even if the electric motor 41 of the actuator 39 malfunctions, it is possible for the outer handle 17, which is urged to the housed position side, to return to the housed position by detaching the hand from the outer handle 17. Therefore, if the electric motor 41 on the actuator 39 side malfunctions, the outer handle 17 can be returned to the housed position, and power consumption for holding the outer handle 17 at the pop-up position can be reduced.

Furthermore, since the light 75 illuminating the operating portion 18a of the outer handle 17 at the pop-up position is mounted on the support case 22, the operating portion 18a of the outer handle 17 can easily be seen even in a dark state such as at night.

Second Embodiment

A second embodiment of the present invention is explained by reference to FIG. 9 to FIG. 12; parts corresponding to those of the first embodiment above are denoted by the same reference numerals and symbols and detailed explanation thereof is omitted.

Figure 9:
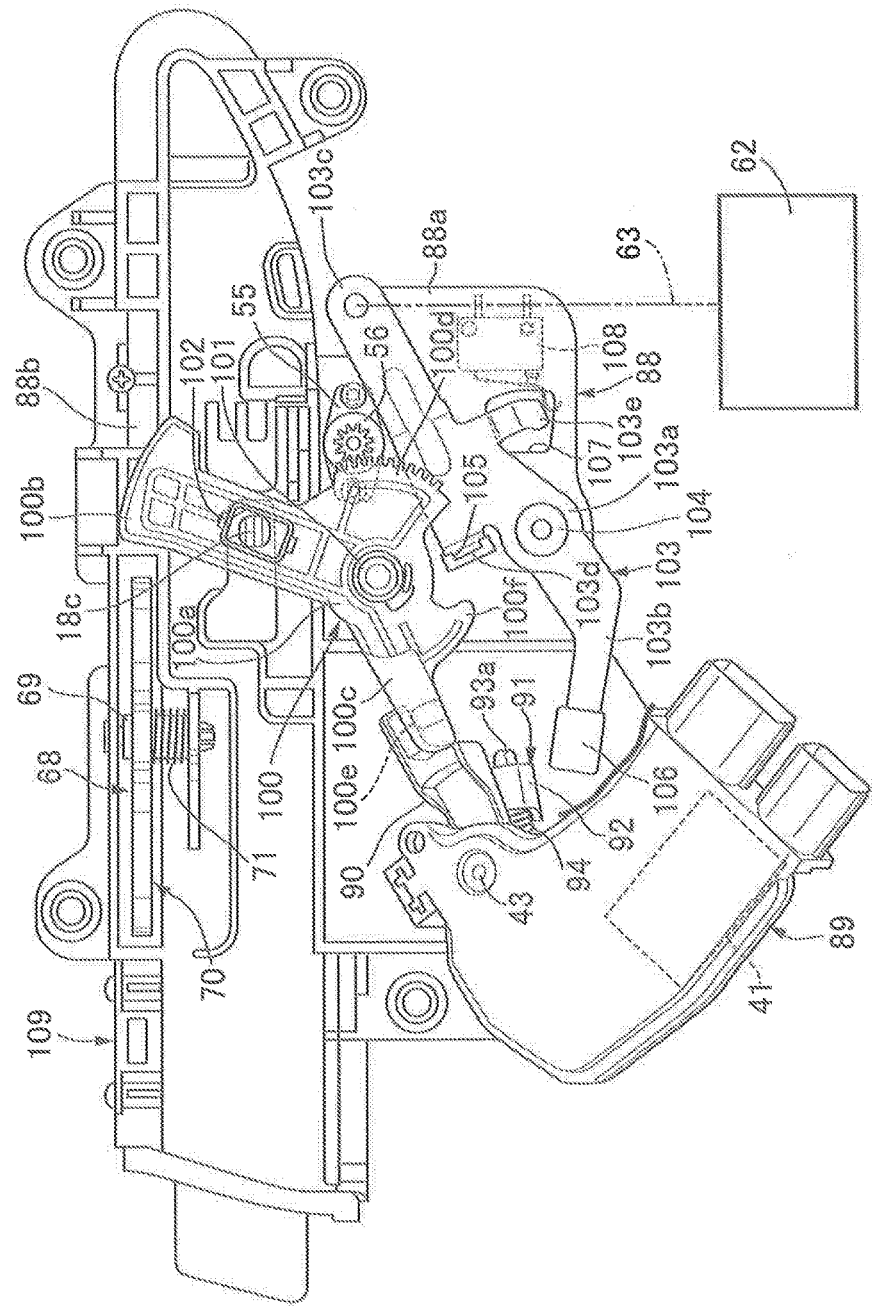
FIG. 9 shows a second embodiment and is a view, corresponding to FIG. 4, in a state in which a drive lever is at an initial position. (second embodiment)

First, in FIG. 9, a support case 88 has a support plate portion 88a and a handle support portion 88b pivotably supporting the outer handle 17 (see first embodiment), and an actuator 89 is mounted on a lower part of the support plate portion 88a.

Figure 10:
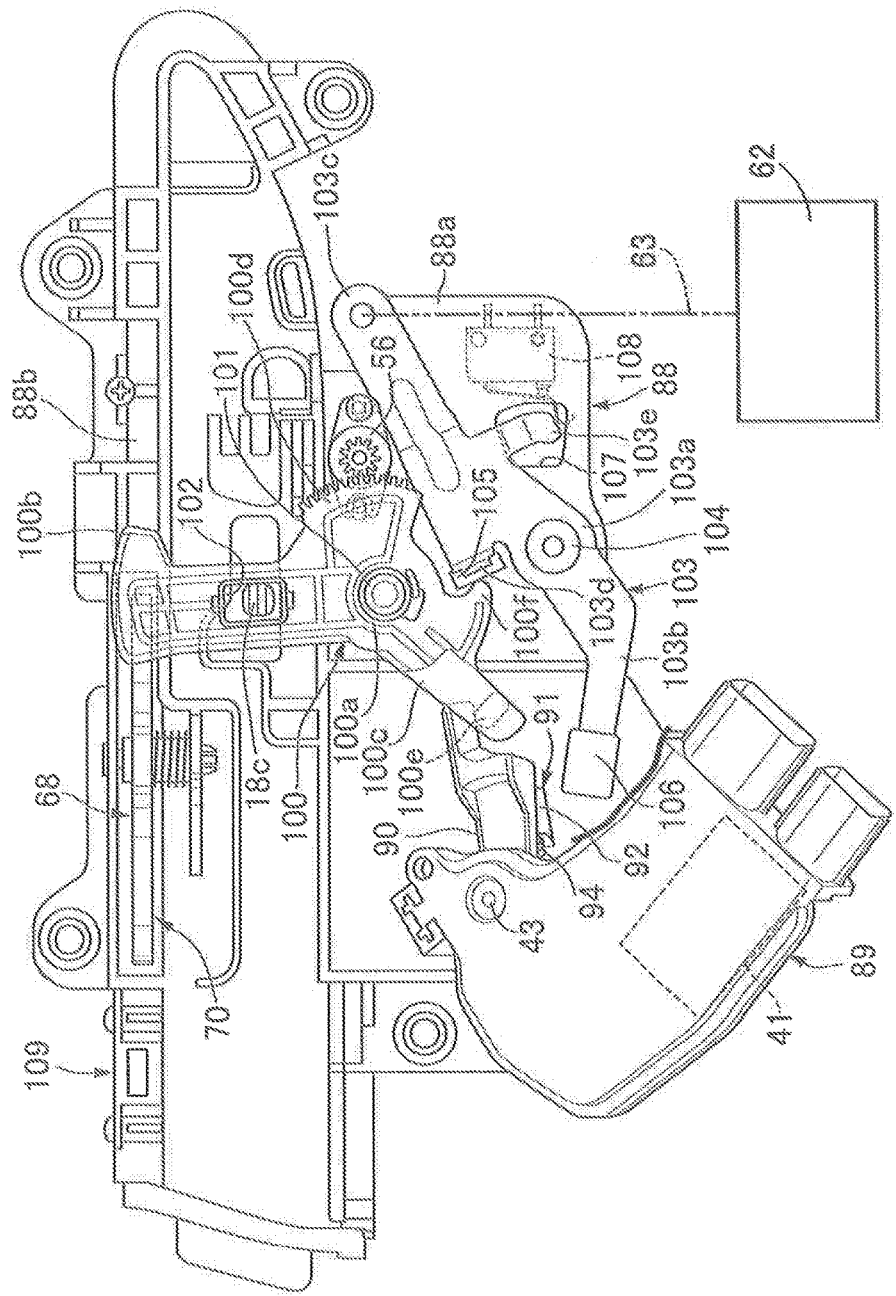
FIG. 10 is a view, corresponding to FIG. 9, in a state in which the drive lever has pivoted to an operated position. (second embodiment)

The actuator 89 is formed so as to include a drive lever 90 that can be pivoted between an initial position shown in FIG. 9 and an operated position shown in FIG. 10, and an electric motor 41 that pivots the drive lever 90 from the initial position to the operated position when energized and allows the drive lever 90 to return from the operated position to the initial position in a non-energized state when the drive lever 90 is at the operated position, a base part of the drive lever 90 being fixed to a pivot shaft 43 that is pivoted by the electric motor 41.

Figure 11:
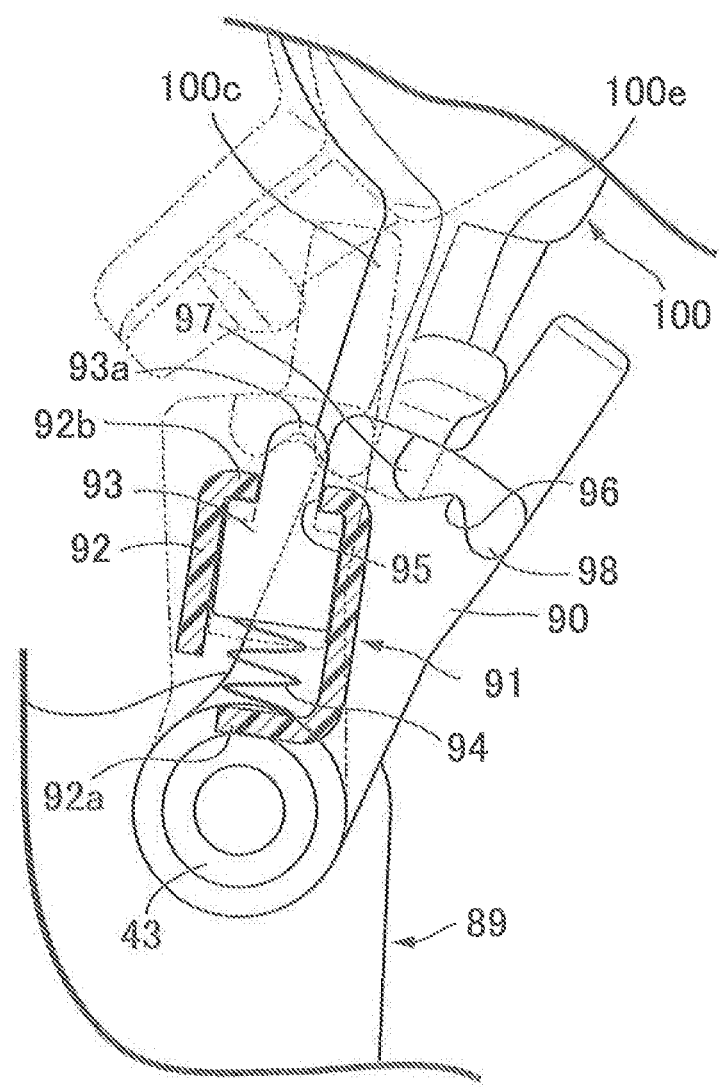
FIG. 11 is a vertical sectional view of holding means when viewed from a support case side. (second embodiment)

Referring in addition to FIG. 11, holding means 91 mechanically holding the drive lever 90 at the operated position is provided on the support plate portion 88a of the support case 88 so as to be disposed between the drive lever 90 and the support plate portion 88a.

This holding means 91 includes a guide tube 92 fixedly provided on the support plate portion 88a so as to extend radially from the pivot shaft 43, a movable piece 93 slidably fitted into the guide tube 92, and a spring 94 provided in a compressed state between the guide tube 92 and the movable piece 93.

The guide tube 92 is formed so as to have a first end wall portion 92a on one end part on the pivot shaft 43 side and a second end wall portion 92b on the other end part spaced from the pivot shaft 43, the spring 94 being provided between the first end wall portion 92a and the movable piece 93. Furthermore, a through hole 95 is formed in a middle part of the second end wall portion 92b, an engagement projection portion 93a provided integrally with the movable piece 93 extending movably through the through hole 95.

On the other hand, provided integrally with a face of the drive lever 90 that opposes the support plate portion 88a are a latching recess part 96 with which the engagement projection portion 93a of the holding means 91 can engage and first and second peak parts 97 and 98 disposed on opposite sides of the latching recess part 96 and protruding toward the guide tube 92 side. When the drive lever 90 is at the initial position, as shown in FIG. 11 the engagement projection portion 93a is at a position away from the latching recess part 96 and the first and second peak parts 97 and 98, and when the drive lever 90 pivots from the initial position to the operated position shown by the chain line in FIG. 11, the engagement projection portion 93a rides over the first peak part 97 and engages with the latching recess part 96, the drive lever 90 being thereby mechanically held at the operated position.

Furthermore, a handle lever 100 is pivotably supported on the support plate portion 88a, this handle lever 100 integrally having a lever base portion 100a pivotably supported by a shaft 101 provided on the support plate portion 88a, an outer handle side link arm portion 100b extending upward from the lever base portion 100a, a drive lever side link arm portion 100c extending from the lever base portion 100a downward toward the drive lever 90 side, and a sector gear portion 100d projecting from the lever base portion 100a in the opposite direction to the actuator 89.

Formed in the outer handle side link arm portion 100b is a link hole 102 extending lengthwise in the longitudinal direction. The extremity of the linking projecting portion 18c of the outer handle 17 is inserted into and linked to the link hole 102, and the handle lever 100 is operatively linked to the outer handle 17. Moreover, the handle lever 100 is urged by a return spring, which is not illustrated, in a direction that returns the outer handle 17 to the housed position side.

An abutting projecting portion 100e abutting against the drive lever 90 at the initial position from the operated position side is projectingly provided integrally with the extremity of the drive lever side link arm portion 100c so as to project toward the support plate portion 88a side, and the handle lever 100 pivots so as to drive the outer handle 17 from the housed position to the pop-up position as a result of the abutting projecting portion 100e being pushed by the drive lever 90 in response to pivoting of the drive lever 90 from the initial position to the operated position.

Moreover, when the outer handle 17 pivots from the pop-up position to the full stroke position, the handle lever 100 pivots together with the outer handle 17 while leaving the drive lever 90 at the operated position since the drive lever 90 is held by the holding means 91.

Furthermore, the sector gear portion 100d meshes with a gear 56 of a rotary damper 55 secured to the support plate portion 88a.

Moreover, a release lever 103 is pivotably supported on the support plate portion 88a of the support case 88, the release lever 103 pivoting in response to pivoting of the handle lever 100 accompanying manual operation of the outer handle 17 from the pop-up position to the full stroke position to thus release the holding by the holding means 91 and forcibly return the drive lever 90 to the initial position.

This release lever 103 integrally has a lever base portion 103a pivotably supported on the support plate portion 88a via a shaft 104 mounted on the support plate portion 88a so as to be disposed beneath the handle lever 100, a drive lever side arm portion 103b extending from the lever base portion 103a toward the drive lever 90 side, and a latch mechanism side arm portion 103c provided connectedly on the lever base portion 103a so as to project toward the side opposite to a part where the actuator 89 is mounted.

A pressure-receiving portion 103d is provided integrally with the latch mechanism side arm portion 103c of the release lever 103 so as to oppose the drive lever side link arm portion 100c of the handle lever 100, and a handle side cap 105 formed from an elastic material is fitted onto the pressure-receiving portion 103d. On the other hand, a pushing arm portion 100f is connectedly provided integrally with the drive lever side link arm portion 100c of the handle lever 100, and the extremity of the pushing arm portion 100f is made to abut against the handle side cap 105 by the handle lever 100 pivoting together with the outer handle 17 when the outer handle 17 pivots from the housed position to the pop-up position. When the outer handle 17 pivots from the pop-up position to the full stroke position, the handle lever 100 pivots together with the outer handle 17 to thus push the handle side cap 105, that is, the pressure-receiving portion 103d, by the pushing arm portion 100f, and the release lever 103 thereby pivots to the position shown in FIG. 12.

Pivoting of the release lever 103 is transmitted to the latch mechanism 62 disposed on the side door 15 via a transmission rod 63 having one end part linked to the extremity of the latch mechanism side arm portion 103c.

A drive lever side cap 106 made of an elastic material is fitted onto the extremity of the drive lever side arm portion 103b of the release lever 103, the drive lever 90 abutting against the drive lever side cap 106 in a state in which it has pivoted from the initial position to the operated position. The drive lever 90 is pushed by the drive lever side arm portion 103b of the release lever 103 by pivoting of the release lever 103 in response to pivoting of the outer handle 17 from the pop-up position to the full stroke position, the drive lever 90 is forcibly pivoted so that the first peak part 97 pushes in the movable piece 93 and the engagement projection portion 93a rides over the first peak part 97, and the drive lever 90 returns to the initial position.

The release lever 103 is pivotingly urged via a spring, which is not illustrated, to the side on which the handle side cap 105 abuts against the pushing arm portion 100f of the handle lever 100.

A pressing portion 103e is connectedly provided integrally with the latch mechanism side arm portion 103c of the release lever 103, the pressing portion 103e being inserted through an opening 107 formed in the support plate portion 88a. A switch 108 is mounted on a face of the support plate portion 88a opposite to the side on which the release lever 103 is disposed, the switching mode of the switch 108 being changed by pushing by the pressing portion 103e in response to pivoting of the release lever 103 accompanying manual operation of the outer handle 17 from the pop-up position to the full stroke position. This switch 108 outputs a signal for opening a window of the side door 15 (see first embodiment) so as to let outside air flow into the vehicle compartment when the switching mode is changed by pushing by the pressing portion 103e.

Furthermore, an inertia mechanism 68 is disposed on the handle support portion 88b of the support case 88, the inertia mechanism 68 preventing the side door 15 from being undesirably opened as a result of the outer handle 17 pivoting to the full stroke position due to an impact due to a side collision with the side door 15 in a state in which the outer handle 17 is at the housed position, and a light 109 illuminating the operating portion 18a (see first embodiment) of the outer handle 17 at the pop-up position is also mounted on the handle support portion 88b of the support case 88.

In accordance with this second embodiment, the same effects as those of the first embodiment above can be exhibited and, moreover, since outside air flows into the vehicle compartment by opening the window of the side door 15 in response to pivoting of the release lever 103 accompanying manual operation of the outer handle 17 from the pop-up position to the full stroke position, it is possible to reduce the difference in air pressure between the inside and the outside of the side door 15, thus making an opening operation of the side door 15 smooth.

Embodiments of the present invention are explained above, but the present invention is not limited to the above embodiments and may be modified in a variety of ways as long as the modifications do not depart from the spirit and scope thereof.

For example, the electric drive source of the actuator is not limited to an electric motor, and may be a solenoid.

The invention claimed is:

1. An outer handle device for a vehicle door, in which an outer handle having in one end part thereof a manually operable operating portion is pivotably supported on a support case mounted on an outer panel of a door, and an actuator that can drive the outer handle at a housed position where the outer handle is housed on the support case side to a pop-up position where the operating portion projects outward from the outer panel, is mounted on the support case, wherein:

the actuator comprises a drive lever that pivots between an initial position and an operated position and an electric drive source that pivots the drive lever from the initial position to the operated position at a time of energization and that allows the drive lever to return from the operated position to the initial position in a non-energized state when the drive lever is at the operated position, the outer handle is pivotingly urged toward a side of the housed position and is supported on the support case so as to be able to pivot to a full stroke position in which the outer handle extends further outward from the outer panel than in the pop-up position accompanying a manual operation from the pop-up position, a biasing device including a spring that applies a biasing force to mechanically hold the drive lever at the operated position is provided on the support case, a handle lever operatively linked to the outer handle so as to be pushed and pivoted by the drive lever in response to pivoting of the drive lever from the initial position to the operated position and, as a result of said pivoting, pivot the outer handle from the housed position to the pop-up position is supported on the support case so as to pivot together with the outer handle while leaving the drive lever at the operated position when the outer handle pivots from the pop-up position to the full stroke position, and a release lever that pivots in response to pivoting of the handle lever accompanying a manual operation of the outer handle from the pop-up position to the full stroke position so as to engage and push the drive lever to release the holding by the biasing device and forcibly return the drive lever to the initial position is supported on the support case wherein a switch that outputs a signal for opening a window of the door so that outside air flows into a vehicle compartment is mounted on the support case such that the signal is outputted by changing of the switching mode in response to pivoting of the release lever accompanying manual operation of the outer handle from the pop-up position to the full stroke position.

2. The outer handle device for a vehicle door according to claim 1, wherein a light that illuminates the operating portion of the outer handle in a state in which it is at the pop-up position is mounted on the support case or the outer handle.

3. An outer handle device for a vehicle door, in which an outer handle having in one end part thereof a manually operable operating portion is pivotably supported on a support case mounted on an outer panel of a door, and an actuator that can drive the outer handle at a housed position where the outer handle is housed on the support case side to a pop-up position where the operating portion projects outward from the outer panel, is mounted on the support case, wherein:

the actuator comprises a drive lever that pivots between an initial position and an operated position and an electric drive source that pivots the drive lever from the initial position to the operated position at a time of energization and that allows the drive lever to return from the operated position to the initial position in a non-energized state when the drive lever is at the operated position, the outer handle is pivotingly urged toward a side of the housed position and is supported on the support case so as to be able to pivot to a full stroke position extending further outward from the outer panel than the pop-up position accompanying a manual operation from the pop-up position, a biasing device that mechanically holds the drive lever at the operated position is provided on the support case, a handle lever operatively linked to the outer handle so as to be pushed and pivoted by the drive lever in response to pivoting of the drive lever from the initial position to the operated position and, as a result of said pivoting, pivot the outer handle from the housed position to the pop-up position is supported on the support case so as to pivot together with the outer handle while leaving the drive lever at the operated position when the outer handle pivots from the pop-up position to the full stroke position, and a release lever that is separate from the handle lever and pivots in response to pivoting of the handle lever accompanying a manual operation of the outer handle from the pop-up position to the full stroke position so as to engage and push the drive lever to release the holding by the biasing device and forcibly return the drive lever to the initial position is supported on the support case wherein a switch that outputs a signal for opening a window of the door so that outside airflows into a vehicle compartment is mounted on the support case such that the signal is outputted by changing of the switching mode in response to pivoting of the release lever accompanying manual operation of the outer handle from the pop-up position to the full stroke position.

* * * * *